United States Patent [19]

Watanabe et al.

[11] Patent Number: 5,523,370

[45] Date of Patent: Jun. 4, 1996

[54] POLY(PARA-T-BUTOXYCARBONYLOXYSTYRENE) AND METHOD OF MAKING

[75] Inventors: Osamu Watanabe, Jouetsu; Toru Nakanishi, Kawasaki; Tomoyoshi Furihata, Kawasaki; Motoyuki Yamada, Kawasaki; Fujio Yagihashi, Yokohama, all of Japan

[73] Assignee: Shin-Etsu Chemical Co., Ltd., Tokyo, Japan

[21] Appl. No.: 420,798

[22] Filed: Apr. 12, 1995

Related U.S. Application Data

[63] Continuation of Ser. No. 165,521, Dec. 13, 1993, abandoned, which is a continuation of Ser. No. 889,361, May 28, 1992, abandoned.

[30] Foreign Application Priority Data

Jun. 7, 1991 [JP] Japan ............... 3-163786

[51] Int. Cl.$^6$ ............................ C08F 18/16
[52] U.S. Cl. ............................ 526/326; 526/173
[58] Field of Search ............................ 526/326, 173

[56] References Cited

U.S. PATENT DOCUMENTS

| | | | |
|---|---|---|---|
| 2,531,355 | 11/1950 | Emerson | 526/326 |
| 2,534,193 | 12/1950 | Emerson | 526/326 |
| 3,170,899 | 2/1965 | Tocker | 526/326 |
| 4,491,628 | 1/1985 | Ito et al. | 430/286 |
| 4,657,845 | 4/1987 | Frechet et al. | 430/326 |
| 4,705,836 | 11/1987 | Ohtsuka et al. | 526/326 |
| 5,145,928 | 9/1992 | Gillberg-LaForce et al. | 526/326 |

FOREIGN PATENT DOCUMENTS

| | | | |
|---|---|---|---|
| 603164 | 8/1960 | Canada . | |
| 2020746 | 1/1992 | Canada | 526/173 |
| 102450 | 3/1984 | European Pat. Off. . | |
| 251241 | 1/1988 | European Pat. Off. . | |
| 0277721 | 8/1988 | European Pat. Off. | 526/326 |
| 330386 | 8/1989 | European Pat. Off. . | |
| 482935 | 1/1973 | Japan | 526/173 |
| 4-13707 | 1/1992 | Japan | 526/173 |

OTHER PUBLICATIONS

1046–TMOG 2 Official Gazette Sep. 4, 1984.

*Polymer*, vol. 24, No. 7, 1983, Butterworth & Co., Ltd., Frechet et al., "Poly(p–tert–butoxydcarbonyloxystyrene): A Convenient Precursor to p–hydroxystyrent Resins", pp. 995–1000.

*Primary Examiner*—Joseph L. Schofer
*Assistant Examiner*—N. Sarofim
*Attorney, Agent, or Firm*—Birch, Stewart, Kolasch & Birch

[57] ABSTRACT

Provided is a poly(para-t-butoxycarbonyloxystyrene) having recurring units of the formula:

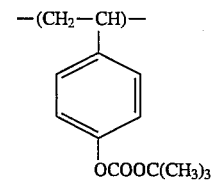

which is prepared by anionic polymerization of para-t-butoxycarbonyloxystyrene. The polymer is of a controlled molecular weight and a narrow molecular weight distribution and has a high degree of resolution and development, meeting the requirements of resist materials. The method allows for simple preparation of such polymers.

8 Claims, 2 Drawing Sheets

POLY(PARA-T-BUTOXYCARBONYLOXYSTYRENE) AND METHOD OF MAKING

This application is a continuation of application Ser. No. 08/165,521 filed on Dec. 13, 1993, now abandoned; which is a continuation of application Ser. No. 07/889,361 filed on May 28, 1992, now abandoned.

CROSS-REFERENCE TO THE RELATED APPLICATIONS

Reference is made to the following copending applications, all assigned to the same assignee as the present invention.

Yagihashi et al, U.S. Application Ser. No. 07/830,923 filed Feb. 4, 1992, now abandoned entitled "Synthesis of Para-tert-butoxycarbonyloxy-styrene", Yamada, Hata, Watanabe, and Yagihashi, U.S. Application concurrently filed herewith entitled "Resist Compositions", and Yamada, Hata, Watanabe, and Yagihashi, U.S. Application entitled "Resist Compositions".

This invention relates to a poly(para-t-butoxycarbonyloxystyrene) suitable as LSI resist and a method for preparing the same.

BACKGROUND OF THE INVENTION

In the prior art, functional polymers are often used as high-resolution lithographic materials in the manufacture of LSI. In accordance with the recent advance of LSI technology toward higher density, the resist material is also required to have a high degree of resolution and development ability. To meet this requirement, in the case of novolak resin which is one of prior art resist materials, a technique of fractionation is utilized to control the molecular weight of the novolak resin for increasing the degree of resolution and development ability (see Japanese Patent Application Kokai No. 1217542/1987). The fractionation technique is, however, complicated in operation and time consuming.

One recently proposed replacement for prior art resist materials is a class of chemically amplified resist materials. Among such resist materials, those compounds having a functional group which is readily eliminatable with acid and showing a substantial difference in solubility before and after the elimination are preferred largely because of ease of processing. Styrene derivatives having good plasma resistance are known desirable from this point of view, but not successful in meeting the recent increasingly rigorous demand.

SUMMARY OF THE INVENTION

Therefore, an object of the present invention is to provide a novel polystyrene which has eliminated the above-mentioned problems of the prior art and is a useful resist material.

The inventors have found that by starting with para-t-butoxycarbonyloxystyrene of the following formula (2) as a monomer and utilizing anionic polymerization, especially living anionic polymerization, a poly(para-t-butoxycarbonyloxystyrene) having recurring units of the following formula (1) and a narrow molecular weight dispersion of from 1.03 to 1.5 is obtained. It is possible to control the molecular weight of the polymer to a desired value. This narrow dispersion p-t-butoxy-carbonyloxystyrene polymer is quite advantageous as a resist material for use in the manufacture of LSI.

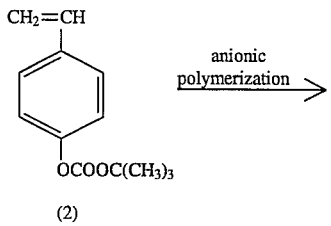

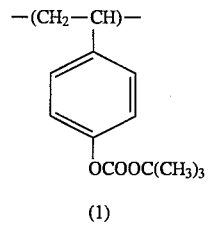

As opposed to conventional polymers used in well-known resists as a major component which are obtained by conventional radical polymerization or polycondensation of corresponding monomers without paying attention to the control of molecular weight and its distribution, anionic polymerization, especially living anionic polymerization of p-t-butoxy-carbonyloxystyrene can result in a poly(para-t-butoxycarbonyloxystyrene) having a molecular weight dispersion as narrow as 1.03 to 1.5. A resist based on such a polymer having a narrow molecular weight distribution can provide a high degree of resolution and development ability, meeting the requirements of the advanced LSI resist material.

Accordingly, the present invention in one aspect provides a poly(p-t-butoxy-carbonyloxystyrene) having recurring units of formula (1). In another aspect, the present invention provides a method for preparing a poly(p-t-butoxycarbonyloxystyrene) having recurring units of formula (1) by anionic polymerization of p-t-butoxycarbonyloxystyrene of formula (2).

DETAILED DESCRIPTION OF THE INVENTION

Figure 1:
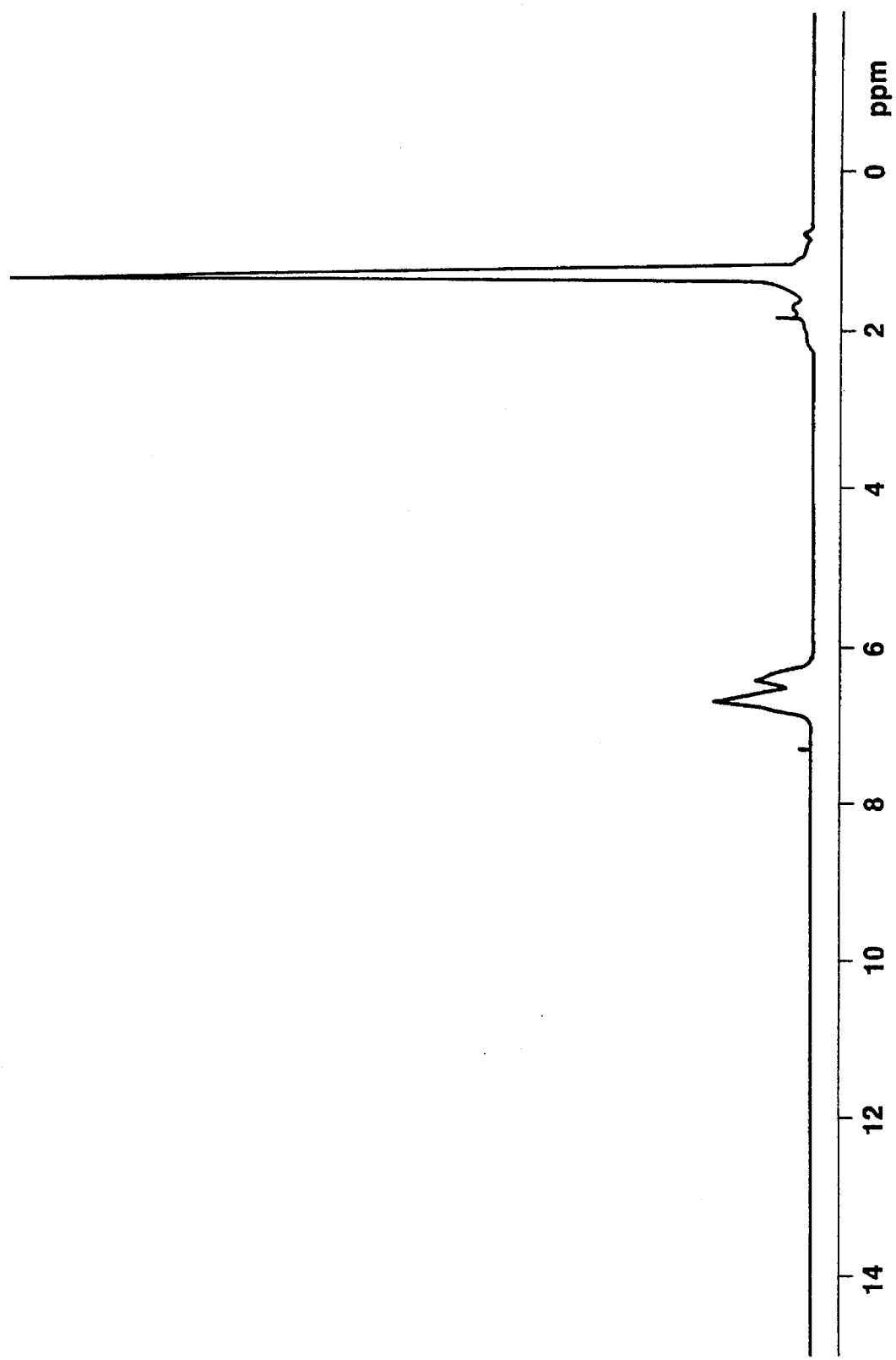
FIG. 1 is a proton-NMR chart of poly(p-t-butoxycarbonyloxystyrene) obtained in Example 1.

The present invention provides a specific styrene derivative polymer that is poly(p-t-butoxycarbonyloxystyrene) having recurring units of the following formula (1).

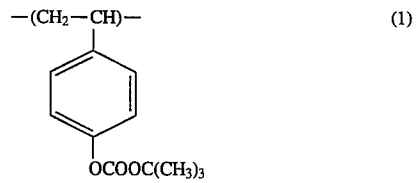

This styrene derivative polymer should preferably have a narrow molecular weight dispersion of from 1.03 to 1.5, more preferably from 1.03 to 1.3. Polymers having a molecular weight dispersion in excess of 1.5 would be less desirable in degree of resolution and development ability as resist material. The molecular weight dispersion used herein is defined as the weight average molecular weight divided by the number average molecular weight, i.e., Mw/Mn. The weight average molecular weight (Mw) of a polymer can be readily calculated, in the case of living polymerization, from the weight of a monomer used and the moles (or molecule number) of a polymerization initiator or measured by an optical scattering technique. The number average molecular weight (Mn) is determined through measurement by a membrane osmometer. The molecular wight distribution is determined by gel permeation chromatography (GPC). The molecular structure is readily identifiable by infrared (IR) spectroscopy and $^1$H—NMR. The narrowly dispersed polystyrene derivative of the present invention should preferably have an average molecular weight of about 2,000 to 100,000 for use as resist material although the molecular weight is not limited to this range.

The poly(p-t-butoxycarbonyloxystyrene) of the present invention is prepared by carrying out anionic polymerization, preferably living anionic polymerization of para-t-butoxy-carbonyloxystyrene of the following formula (2). Accordingly, the poly(p-t-butoxycarbonyloxy-styrene) of the invention is obtained as a living polymer.

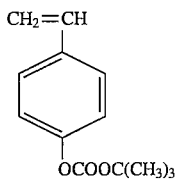

The monomer of formula (2) may be prepared by any prior art well-known method. As disclosed in EP 104,250, for example, the monomer is prepared by converting p-hydroxy-acetophenone with potassium t-butoxide into a corresponding potassium salt, reacting the salt with di-t-butyl dicarbonate to form p-t-butoxycarbonyloxybenzaldehyde, and reacting it with a Wittig reagent such as methylenetriphenylphosphorane as shown by reaction scheme A below. Alternatively, the monomer is prepared by converting p-hydroxystyrene with potassium t-butoxide into a corresponding potassium salt and reacting the salt with di-t-butyl dicarbonate as shown by reaction scheme B below. (Bu-t or t-Bu is a tertiary butyl group, and Ph is a phenyl group.)

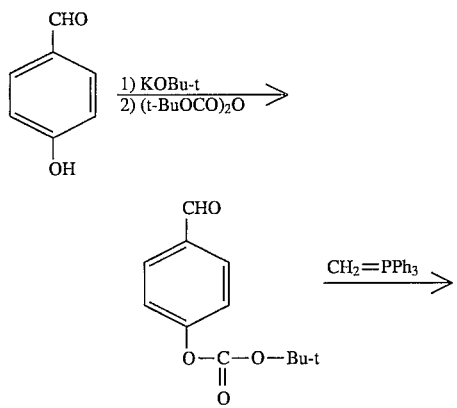

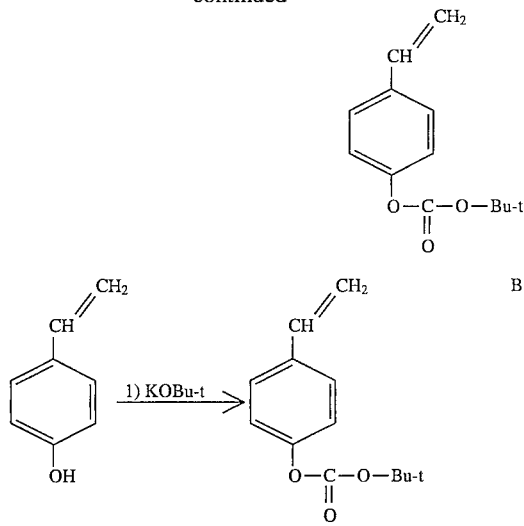

Also, the process that we proposed in copending U.S. Application Ser. No. 07/830,923 (filed Feb. 4, 1992) or EP Application No. 92300956.7 (filed Feb. 4, 1992) is recommended because p-t-butoxycarbonyloxy-styrene can be prepared from a starting material which is readily available and easy to handle in a commercially advantageous manner. The process involves the steps of reacting p-acetoxystyrene with an alkali metal alkoxide to form an alkali metal phenolate, and tertiary carbonyloxylating the alkali metal phenolate, thereby synthesizing p-tert-butoxycarbonyloxystyrene as shown below.

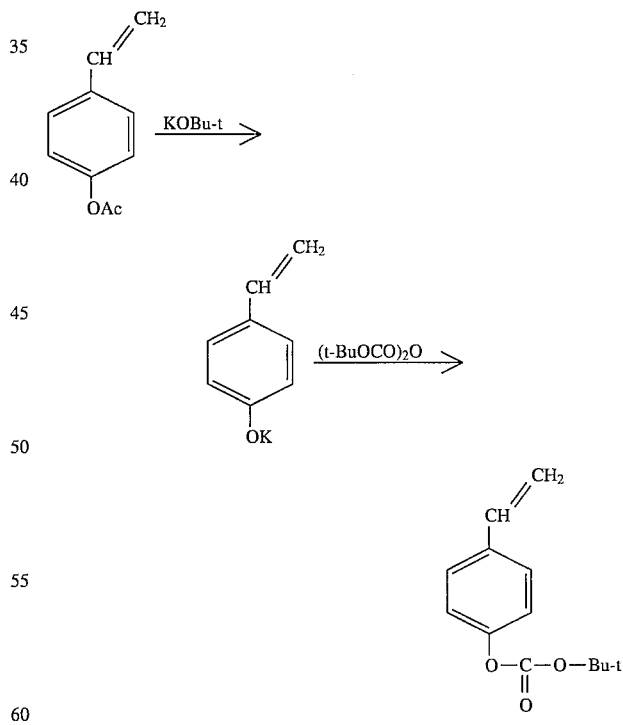

Often initiators are used in polymerizing p-tert-butoxycarbonyloxystyrene of formula (2). Although the type of polymerization initiator is not critical, organometallic compounds are preferred initiators. Exemplary are organic alkali metals including n-butyl-lithium, sec-butyllithium, tert-butyllithium, sodium naphthalene, potassium naphthalene, sodium anthracene, disodium α-methylstyrene tetramer, cumylpotassium, and cumylcecium.

Polymerization is generally carried out in an organic solvent. Examples of the organic solvent include aromatic hydrocarbons such as benzene and toluene, cyclic ethers such as tetrahydrofuran, dioxane and tetrahydropyran, and aliphatic or cycloaliphatic hydrocarbons such as dimethoxyethane, n-hexane and cyclohexane, alone or in admixture of two or more. Most preferred is tetrahydrofuran.

In general, a solution of the monomer in an organic solvent preferably in concentrations of about 1 to 30% by weight is subject to polymerization with stirring in high vacuum or in an inert gas atmosphere such as argon and nitrogen. The reaction temperature may range from about −78° C. to the boiling point of the solvent used. For example, a reaction temperature of from −78° C. to 0° C. is selected for tetrahydrofuran system and room temperature is selected for benzene system.

Polymerization is continued for about 10 minutes to about 5 hours until a desired molecular weight is reached. Then a suitable stopper such as methanol, water and methyl-bromide is added to the reaction system for terminating the reaction. During living polymerization, a color characteristic of anionic living appears at active terminals. After the completion of reaction, the polymer is separated, for example, by adding methanol to cause the polymer to precipitate, followed by drying. There is obtained a poly(p-t-butoxy-carbonyloxystyrene) having recurring units of formula (1) and a desired molecular weight.

EXAMPLE

Examples of the present process are given below by way of illustration and not by way of limitation.

Example 1

Synthesis of p-t-butoxycarbonyloxystyrene monomer

With ice cooling, 310 ml of a 1.0-M solution of potassium tertiary butoxide in tetrahydrofuran was stirred until a temperature of 5° C. was reached. To the solution, 50 grams (0.31 mol) of p-acetoxystyrene was added dropwise over 30 minutes. During this addition, the reaction solution was maintained at a temperature below 20° C. At the end of addition, the solution was allowed to stand under the conditions for 30 minutes, obtaining a yellowish orange colored tetrahydrofuran solution of potassium p-vinylphenolate. With stirring and ice water cooling, a solution of 67.28 grams (0.31 mol) of di-t-butyl dicarbonate in 60 ml of tetrahydrofuran was added dropwise to the reaction solution, which was maintained at a temperature below 20° C. At the end of addition, the reaction mixture was stirred for one hour at room temperature. It was combined with 30 ml of saturated saline water and shaken for subsequent decantation. The organic layer was dried over anhydrous sodium sulfate and the solvent distilled off. The oily residue was subjected to vacuum distillation, yielding 65 grams of a colorless oily product as a fraction of 90° to 92° C. /0.2 mmHg. It was p-t-butoxy-carbonyloxystyrene (GC 98.5%, yield 95.7%).

To remove water and other impurities from the p-tert-butoxycarbonyloxystyrene monomer, the monomer was subjected to distillation along with $CaH_2$ and refined with sodium benzophenone before polymerization.

Preparation of poly(p-t-butoxycarbonyloxy-styrene)

A 1-liter flask was charged with 700 ml of tetrahydrofuran solvent and $2\times10^{-3}$ mol of potassium naphthalene as an initiator. To the mixture was added 50 grams of the p-t-butoxycarbonyloxystyrene monomer diluted with 50 ml of tetrahydrofuran at −78° C. The reaction solution turned red after one hour of polymerization. Reaction was continued until a desired molecular weight (15,000) was reached. Polymerization was terminated by adding methanol to the reaction solution. The reaction solution was poured into methanol whereby the polymer was precipitated and thereafter, separated and dried. There was obtained 29.5 grams of a white polymer.

Figure 2:
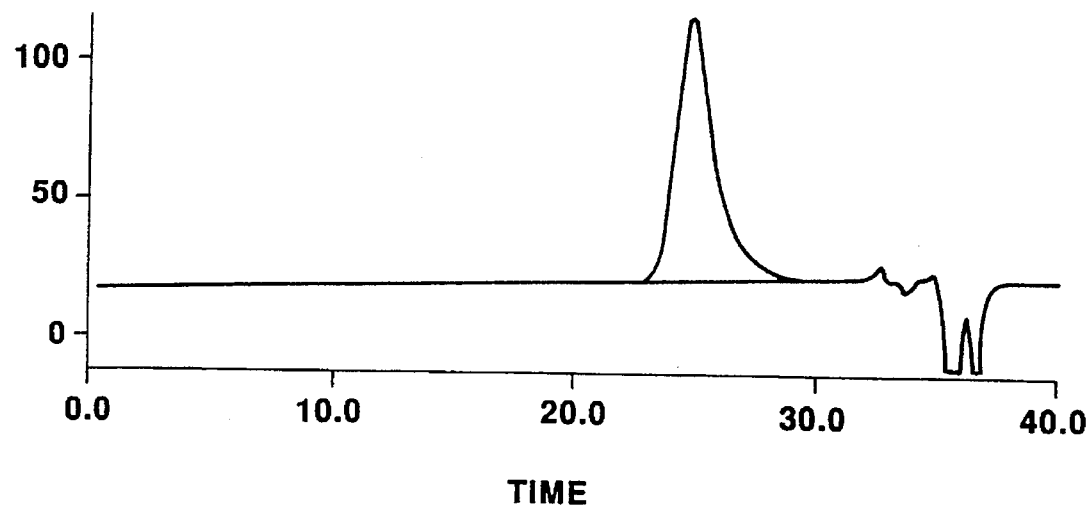
FIG. 2 is a GPC elution curve of the polymer prepared in Example 1.

FIG. 1 is a diagram of $^1H$—NMR analysis of the polymer and FIG. 2 is the GPC elution curve of the polymer. Based on IR and $^1H$—NMR analysis, the polymer was identified to be a poly(p-t-butoxycarbonyloxystyrene) in which active terminals remained unreacted with p-t-butoxycarbonyloxy groups, that is, styrenic vinyl groups terminated. By membrane osmometry, the number average molecular weight (Mn) of the polymer was measured to be $1.3\times10^4$ g/mol. The molecular weight dispersion (Mw/Mn) was as narrow as 1.15. The GPC elution curve shows that the polymer has a narrow molecular weight distribution and a high degree of mono-dispersion (or narrow dispersion).

Example 2

Polymerization was carried out using the refined p-t-butoxycarbonyloxystyrene monomer obtained in Example 1. A 2-liter flask was charged with 1 liter of tetrahydrofuran solvent and $9\times10^{-4}$ mol of n-butyllithium as an initiator. To the mixture was added 50 grams of the p-t-butoxycarbonyloxystyrene monomer diluted with 100 ml of tetrahydrofuran at −78° C. The reaction solution turned red after 30 minutes of polymerization. Reaction was continued until a desired molecular weight (55,000) was reached. Polymerization was terminated by adding methanol to the reaction solution. The reaction solution was poured into methanol whereby the polymer was precipitated and thereafter, separated and dried. There was obtained 24.5 grams of a white polymer.

Figure 3:
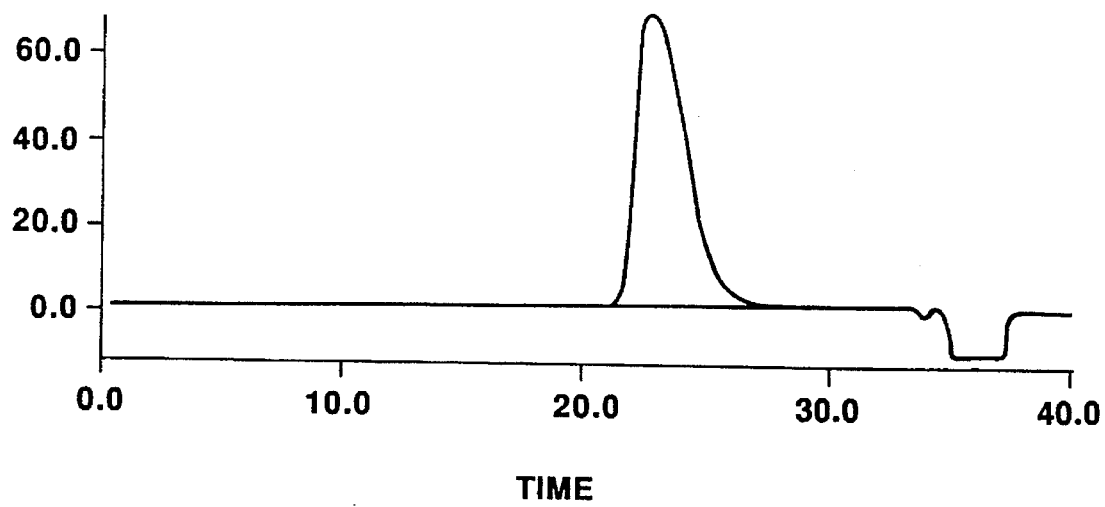
FIG. 3 is a GPC elution curve of another polymer prepared in Example 2.

The $^1H$ —NMR analysis of the polymer provided a characteristic absorption diagram as in Example 1. The molecular weight dispersion (Mw/Mn) was 1.20. The GPC elution curve of FIG. 3 shows that the polymer has a high degree of mono-dispersion.

There have been described p-t-butoxycarbonyloxystyrene polymers having a controlled molecular weight and a narrow molecular weight distribution. The polymers have a high degree of resolution and development as photosensitive polymers, meeting the requirements of the advanced resist materials. The method of the present invention allows for simple preparation of such valuable polymers.

Although some preferred embodiments have been described, many modifications and variations may be made thereto in the light of the above teachings. It is therefore to be understood that within the scope of the appended claims, the invention may be practiced otherwise than as specifically described.

We claim:

1. A poly(para-t-butoxycarbonyloxystyrene) having recurring units of the following formula (1):

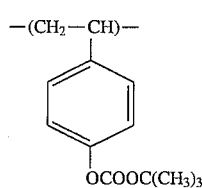

and a molecular weight distribution Mw/Mn of 1.03 to 1.3, that is obtained by living anionic polymerization of para-t-butoxycarbonyloxystyrene of the following formula (2):

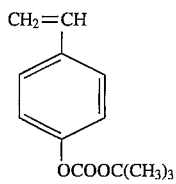

2. The poly(para-t-butoxycarbonyloxystyrene) according to claim 1, wherein the molecular weight distribution is 1.03 to 1.2.

3. The poly(para-t-butoxycarbonyloxystyrene) according to claim 1, having an average molecular weight of 2,000 to 100,000.

4. A resist composition, comprising a poly(para-t-butoxycarbonyloxystyrene) having recurring units of the following formula (1):

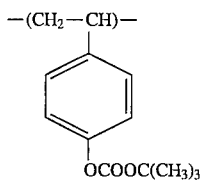

and a molecular weight distribution Mw/Mn of 1.03 to 1.3, that is obtained by living anionic polymerization of para-t-butoxycarbonloxystyrene of the following formula (2):

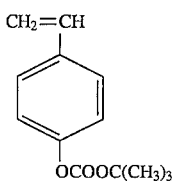

5. A polymer of para-t-butoxycarbonyloxystyrene having recurring units of the following formula (1):

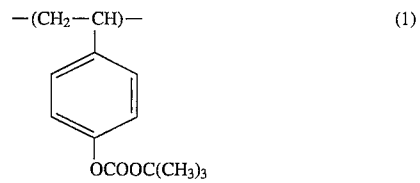

and a molecular weight distribution Mw/Mn of 1.03 to 1.3 that is obtained by a process of living anionic polymerization of para-t-butoxycarbonyloxystyrene comprising the steps of:

reacting a compound of the formula (2)

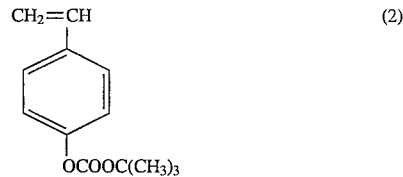

in the presence of alkali metal, organometallic polymerization initiators in an organic solvent, under high vacuum or in an inert gas atmosphere, at a temperature between −78° C. and the boiling point of the solvent for a period from 10 minutes to about 5 hours until a desired molecular weight is reached;

stopping the reaction with a suitable stopper by adding said stopper to the reaction system; and recovering the polymer poly(p-t-butoxycarbonyloxystyrene) by precipitation.

6. The poly(para-t-butoxycarbonyloxystyrene) according to claim 1, wherein the molecular weight distribution Mw/Mn is from 1.03 to 1.20.

7. The resist composition according to claim 4, wherein the molecular weight distribution Mw/Mn is from 1.03 to 1.20.

8. The polymer of claim 5, wherein the compound of formula (2) is reacted in the presence of an organic solvent in a concentration of about 1 to 30% by weight.

* * * * *